United States Patent
Melcher et al.

(10) Patent No.: US 10,488,686 B1
(45) Date of Patent: Nov. 26, 2019

(54) SYSTEMS WITH SYNCHRONIZED WINDOWS

(71) Applicant: Apple Inc., Cupertino, CA (US)

(72) Inventors: Martin Melcher, Mountain View, CA (US); James R. Wilson, Cupertino, CA (US); Clarisse Mazuir, San Jose, CA (US); David E. Kingman, Campbell, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 15/634,946

(22) Filed: Jun. 27, 2017

Related U.S. Application Data

(60) Provisional application No. 62/368,108, filed on Jul. 28, 2016.

(51) Int. Cl.
| | | |
|---|---|---|
| *G02F 1/133* | (2006.01) | |
| *G02F 1/137* | (2006.01) | |
| *G02F 1/1334* | (2006.01) | |
| *B60J 3/06* | (2006.01) | |
| *B60J 3/04* | (2006.01) | |

(52) U.S. Cl.
CPC ............ *G02F 1/13318* (2013.01); *B60J 3/04* (2013.01); *B60J 3/06* (2013.01); *G02F 1/137* (2013.01); *G02F 1/1334* (2013.01); *G02F 1/13306* (2013.01)

(58) Field of Classification Search
CPC .................................................... G02F 1/1331
See application file for complete search history.

(56) References Cited

U.S. PATENT DOCUMENTS

| | | | | |
|---|---|---|---|---|
| 5,432,526 | A * | 7/1995 | Hyatt | B60R 16/0373 345/87 |
| 6,509,832 | B1 | 1/2003 | Bauer et al. | |
| 6,795,226 | B2 | 9/2004 | Agrawal et al. | |
| 7,771,061 | B2 | 8/2010 | Varaprasad et al. | |
| 2005/0264472 | A1* | 12/2005 | Rast | G09G 3/14 345/30 |
| 2009/0027759 | A1* | 1/2009 | Albahri | B60J 3/04 359/277 |
| 2010/0094501 | A1* | 4/2010 | Kwok | G02B 27/01 701/36 |
| 2013/0182905 | A1* | 7/2013 | Myers | H04N 7/18 382/103 |

(Continued)

FOREIGN PATENT DOCUMENTS

WO  WO 2017/053040  *  3/2017 ............... B60J 3/04

*Primary Examiner* — Sang V Nguyen
(74) *Attorney, Agent, or Firm* — Treyz Law Group, P.C.; G. Victor Treyz; Michael H. Lyons

(57) ABSTRACT

A system such as a vehicle may have window that exhibit adjustable transparency. The windows may include liquid crystal devices and polymer dispersed liquid crystal devices that exhibit adjustable amounts of light transmission and haze. An optical property of a window such as window transparency may be modulated using an alternating-current modulation waveform. Modulation of the transparency of the window may be synchronized with modulated light output from a light source. The light source may be located inside the vehicle or may be located outside of the vehicle. By synchronizing the modulation of the transparency of the window with the light source output, privacy may be enhanced or glare may be reduced.

20 Claims, 7 Drawing Sheets

(56) References Cited

U.S. PATENT DOCUMENTS

| | | | |
|---|---|---|---|
| 2015/0036092 A1* | 2/2015 | Miyake | G02F 1/133753 |
| | | | 349/144 |
| 2015/0253594 A1* | 9/2015 | Roberts | G02F 1/0126 |
| | | | 359/241 |
| 2015/0309316 A1* | 10/2015 | Osterhout | G06F 3/012 |
| | | | 345/8 |
| 2016/0005281 A1* | 1/2016 | Laska | G06K 9/00771 |
| | | | 348/143 |
| 2016/0209648 A1* | 7/2016 | Haddick | G02B 27/0093 |
| 2017/0219859 A1* | 8/2017 | Christophy | G02F 1/1323 |
| 2018/0012433 A1* | 1/2018 | Ricci | H04L 9/321 |
| 2018/0304727 A1* | 10/2018 | Choi | B60J 3/04 |

* cited by examiner

SYSTEMS WITH SYNCHRONIZED WINDOWS

This application claims the benefit of provisional patent application No. 62/368,108, filed on Jul. 28, 2016, which is hereby incorporated by reference herein in its entirety.

FIELD

This relates generally to structures that pass light, and, more particularly, to synchronizing adjustable windows such as vehicle windows with equipment that produces light.

BACKGROUND

Vehicle occupants often desire privacy. Privacy sunshades may be raised to cover windows to provide privacy, but can block an occupant's view out of the windows. One-way mirror coatings or tints can be formed on the side windows of a vehicle to enhance privacy, but these arrangements may cause the windows to be too shiny or too dark.

It can therefore be challenging to provide vehicle windows with desired characteristics. If care is not taken, windows may be too reflective, may be insufficiently transparent for viewing, may have an appearance that is insufficiently flexible, or may have other undesired attributes.

SUMMARY

A system such as a vehicle may have windows with adjustable optical properties. A window may include a light modulator layer such as a liquid crystal layer with polarizers, may include a guest-host liquid crystal light modulator layer, may include a cholesteric liquid crystal layer that can be adjusted to exhibit changes in light transmission and reflectivity, may include an adjustable haze layer such as polymer dispersed liquid crystal layer, and may include other layers that can be controlled to adjust the transparency of the window (e.g., to exhibit adjustable amounts of light transmission and/or haze).

A vehicle window may interact with internal and external source of light. A vehicle may, for example, include an interior light that illuminates interior objects in the vehicle. A vehicle may also include a display with an array of pixels for displaying images. A display may be hardwired into a vehicle. Displays associated with portable electronic devices may also be placed in the interior of a vehicle. Another source of light that may be used in a vehicle interior is an image projector that projects image onto a screen or a portion of a vehicle window. External light sources that produce light in the vicinity of a vehicle include a vehicle's headlights or tail lights, headlights on other vehicles, street lights, and other exterior lighting.

Internal and external sources of light may be modulated with alternating current modulation waveforms. For example, an interior light may be turned on and off in accordance with an alternating current modulation waveform. The frequency with which the interior light is turned on and off may be sufficiently high to make the modulation of the interior light undetectable to a vehicle occupant. For example, the interior light may be turned on and off at a frequency of 200 Hz, which is too rapid to be noticed by the human eye. Accordingly, the modulation of the light produced by the interior light may be unnoticeable to a vehicle user. If desired, display output, projector output, exterior lighting output, and/or other light output may be modulated with the alternating current modulation waveform.

The adjustable optical properties of the window (e.g., light transmission, haze, and reflectivity) may be modulated using an alternating current modulation waveform that is synchronized to the modulation waveform that is used in producing the light from an internal and/or external source of light. This may help enhance privacy or reduce glare by ensuring that the window has a reduced transparency whenever the source of light is emitting light. At the same time, the window is still partially transparent, because the window is dark only during portions of the alternating current modulation waveform.

Light source modulation and window modulation control signals can be synchronized by coupling control circuitry in a vehicle directly to a light source and to a light modulator in a window using hardwired paths. The hardwired paths may be used in conveying modulation signals to the light source and light modulator from the control circuitry. Synchronization operations may also be performed by providing the control circuitry with information on the output of the modulated light source using a light detector or by wirelessly conveying synchronization information from a modulated light source to the control circuitry.

DETAILED DESCRIPTION

A system may have windows formed from electrically adjustable components. The system may be a building, a vehicle, or other suitable system. Illustrative configurations in which the system with the windows is a vehicle may sometimes be described herein as an example. This is merely illustrative. Window structures may be formed in any suitable system.

The electrically adjustable components of the windows may be used to adjust the optical properties of the windows. For example, electrically adjustable windows may be adjusted to change the reflectivity and therefore the light transmission of the windows, may be used to adjust the absorption of light by the windows and therefore the transmission (transmissivity) of the windows to light, and/or may adjusted to change the haze of the windows as a function of time. If desired, modulation of the optical properties of the windows may be made in synchronization with modulation of the light output from interior lights, light emitted by the pixels in a display pixel array, a projector, and/or exterior lights.

The transparency of a window may, as an example, be modulated using an alternating-current transparency modulation waveform such as a square wave or other modulation signal. A light-emitting component such as an interior light may be modulated in synchronization with the window transparency modulation signal using the same alternating-current waveform. When synchronized in this way, the window may be opaque or hazy each time the interior light is turned on and may be transparent each time the interior light is turned off.

The frequency of the alternating-current modulation signal may relatively high (e.g., over 60 Hz, over 100 Hz, 200 Hz or more, or other suitable frequency). These frequencies create light intensity changes that are more rapid than can be detected by the eyes of a human observer. As a result, the alternating-current interior light appears constant to an occupant of the vehicle and the windows appear to have a constant transparency level (no flicker). At the same time, when the exterior of the vehicle is dark (e.g., at night), external observers of the vehicle will not be able to see inside the vehicle because the window is non-transparent whenever the interior light producing component is producing light.

Figure 1:
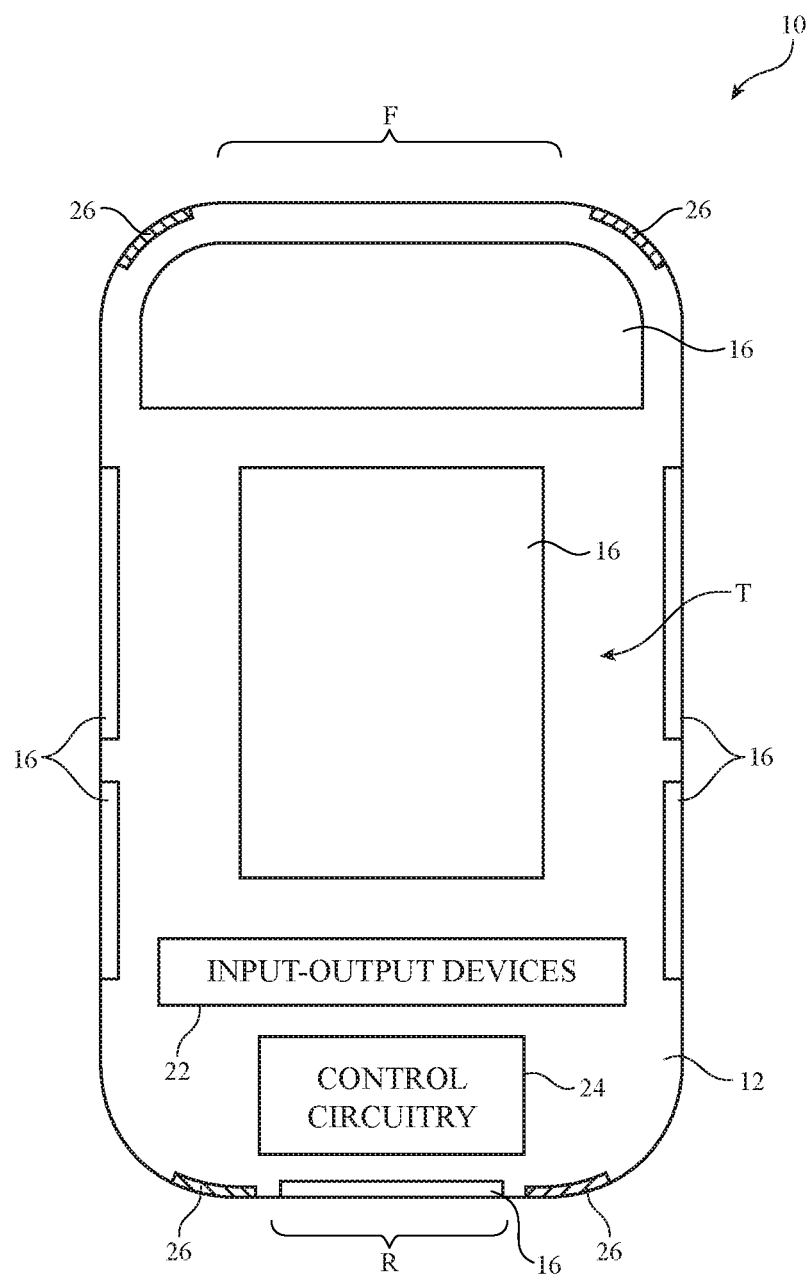
FIG. 1 is a schematic diagram of an illustrative system in accordance with an embodiment.

An illustrative system with windows is shown in FIG. 1. As shown in FIG. 1, system 10 may be a vehicle having a body such as body 12 with a chassis to which wheels are mounted, propulsion and steering systems, and other vehicle systems. Body 12 may include doors, trunk structures, a hood, side body panels, a roof, and/or other body structures. Seats may be formed in the interior of vehicle 10. Vehicle 10 may include windows such as window(s) 16. Window 16 and portions of body 12 may separate the interior of vehicle 10 from the exterior environment that is surrounding vehicle 10.

Windows 16 may include a front window 16 on front F of vehicle 10, a moon roof window 16 or other window extending over some or all of top T of vehicle 10, a rear window 16 on rear R of vehicle 10, and side windows on the sides of vehicle 10 between front F and rear R. Window 16 may be formed from one or more layers of transparent glass, clear polymer (e.g., polycarbonate), polymer adhesive layers, and/or other layers. In some arrangements, window(s) 16 may include laminated window structures such as one or more layers of glass with interposed polymer layer(s). The polymer in a laminated window may be, for example, a polymer such as polyvinyl butyral (PVB) or ethylene-vinyl acetate (EVA). Adjustable layers in window 16 may, if desired, be embedded in a polymer layer such as a PVB or EVA layer that is interposed between outer and inner glass layers. If desired, exterior lights 26 and other components in vehicles such as vehicle 10 may be provided with adjustable layers (e.g., electrically adjustable components to adjust reflection, light transmission, haze, and/or other optical properties for lights 26).

Vehicle 10 may include control circuitry 24 and input-output devices 22. Control circuitry 24 may include storage and processing circuitry for supporting the operation of vehicle 10. The storage and processing circuitry may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 24 may be used to control the operation of vehicle 10 and the components in vehicle 10 (e.g., components associated with windows 16, lights 26, input-output components 22, etc.). For example, processing circuitry can adjust the haze, light transmission, and/or reflectivity of one or more layers in windows 16, may make adjustments to other input-output components 22, and/or may make other adjustments to components such as windows 16, lights 26, etc. The processing circuitry may be based on one or more microprocessors, microcontrollers, digital signal processors, baseband processors, power management units, audio chips, application specific integrated circuits, etc.

Input-output devices 22 may be used to gather data for vehicle 10, may be used to gather information from a user (vehicle occupant, etc.) of vehicle 10, may be used to provide data from vehicle 10 to external systems or a user, and/or may be used in handling other input and output operations. Input-output devices 22 may include buttons, scrolling wheels, touch pads, key pads, keyboards, and other user input devices. Microphones may be used to gather voice input from a user and may gather information on ambient sounds. Devices 22 may include ambient light sensors, proximity sensors, magnetic sensors, force sensors, accelerometers, image sensors, and/or other sensors for gathering input. Output may be supplied by devices 22 using audio speakers, tone generators, vibrators, haptic devices, displays, light-emitting diodes and other light sources, and other output components. Vehicle 10 (e.g., devices 22, etc.) may include wired and wireless communications circuitry that allows vehicle 10 (e.g., control circuitry 24) to communicate with external equipment and that allows signals to be conveyed between components (circuitry) at different locations in vehicle 10.

Figure 2:
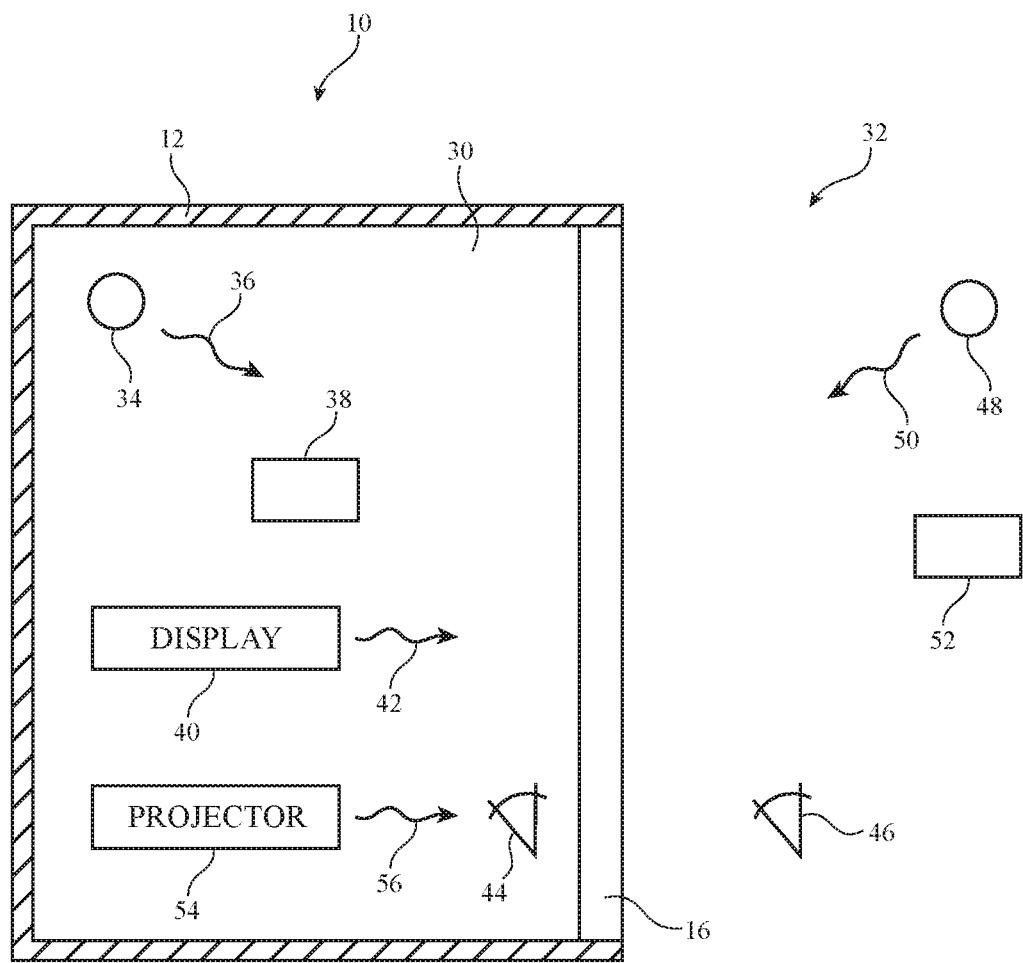
FIG. 2 is a diagram of the illustrative system of FIG. 1 showing components that may be placed in interior and exterior locations in accordance with an embodiment.

A diagram of vehicle 10 that shows vehicle 10 in an illustrative operating environment is shown in FIG. 2. Vehicle 10 may have a body such as body 12 that defines an interior region such as interior 30 and an exterior region such as region 32. Window 16 may be mounted in body 12 of vehicle 10 and may separate interior 30 from exterior 32. Window 16 may have one or more layers with optical properties (e.g., light transmission, reflectivity, and/or haze) that can be electrically adjusted by control circuitry 24. Window 16 may also have structural glass layers that help support the layer(s) with adjustable optical properties. For example, window 16 may have an outer glass layer and an inner glass layer that are laminated to each other with a PVB layer, an EVA layer, or other adhesive layer. One or more adjustable components (light modulators, adjustable haze layers, adjustable reflectors, etc.) may be incorporated into window 16 (e.g., by embedding one or more of these adjustable components in the adhesive layer between the outer and inner glass layers.

Adjustable components that may be used in adjusting light transmission for window 16 include liquid crystal light modulators (e.g., liquid crystal light modulator layers with polarizers such as liquid crystal light modulator layers having liquid crystal material and electrodes for applying electric fields to the liquid crystal material that are interposed between a pair of polarizers) and guest-host liquid crystal light modulators. A guest-host liquid crystal device may include a light-absorbing dye "guest" in a liquid crystal "host" layer. These materials may form a layer that is sandwiched between a pair of transparent electrodes. When an electric field is applied to the guest-host layer, the liquid crystals rotate, thereby rotating the guest dye into an orientation that enhances light absorption. When the electric field is removed, the guest dye molecules are no longer held in the high-absorption orientation so that the light modulator layer becomes transparent. If desired, the electric field strength may be adjusted to produce an intermediate level of light absorption.

Adjustable components that may be used in adjusting reflectivity for window 16 and therefore in adjusting light transmission for window 16 include cholesteric liquid crystal layers. Cholesteric liquid crystal layers may exhibit relatively fast switching speeds, low haze (e.g., haze values of less than 5%), and good reflectivity. A cholesteric liquid crystal device may exhibit a mirror reflectivity that is adjustable by adjusting a voltage applied to electrodes in the device. When used in window 16, the cholesteric liquid crystal device may be characterized by an "on" state and an "off" state. In the "on" state (e.g., when control circuitry 24 applies a voltage to the device), the cholesteric liquid crystal device may be transparent. In the "off" state, the cholesteric liquid crystal device may act as a partial mirror and may reflect more than 50% of incident light, more than 70% of incident light, less than 99% of incident light, or other suitable amount of incident light. When in the off state, the device may be characterized by a reduced light transmission (i.e., the device may be light absorbing rather than transparent). Intermediate levels of light reflection may be achieved by applying an electric field across the cholesteric liquid crystal device at an intermediate level. Because light transmission can be modulated using an adjustable reflectivity layer such as a cholesteric liquid crystal layer, cholesteric liquid crystal devices may sometimes be referred to as light modulators, light modulation layers, and or light transmission modulators.

An adjustable component that may be used in adjusting haze (translucency) for window 16 (i.e., an adjustable haze layer) is a polymer-dispersed liquid crystal device. In this type of device, a polymer layer having voids filled with liquid crystal material may be sandwiched between conductive transparent electrodes on respective first and second transparent substrates. When no electric field is applied to the electrodes, the liquid crystals in the voids are randomly oriented and exhibit an index-of-refraction difference with the surrounding polymer layer. This causes the liquid crystal material of the voids to produce a relatively large amount of haze that scatters light that is passing through the device. When electric field is applied to the electrodes by control circuitry 24, the liquid crystals in the voids becomes aligned so that the liquid crystal material in the voids exhibits an index of refraction that matches the surrounding polymer. In this configuration, the polymer-dispersed liquid crystal device exhibits low haze and high transparency. Intermediate haze levels may be achieved by applying an electric field at an intermediate level.

An adjustable light absorption layer such as a liquid crystal modulator or guest-host liquid crystal, an adjustable reflectivity layer such as a cholesteric liquid crystal layer or switchable metal hydride film, and/or an adjustable haze layer such as a polymer dispersed liquid crystal layer may be embedded within a PVB layer or other adhesive layer that is sandwiched between a pair of laminated glass layers (e.g., glass window layers that are being joined by the PVB layer to form a laminated window). Moreover, other types of light modulators, reflectivity modulators, and/or haze modulators may be used, if desired.

As shown in FIG. 2, system 10 may have an interior light source such as interior light source 34. Light source 34 may be formed form one or more light-emitting diodes (e.g., red, green, and/or blue light-emitting diodes, white light-emitting diodes, etc.) or other source of illumination. Light source 34, which may sometimes be referred to as an interior light source or interior light, may be located in interior 30 and may be used to illuminate interior objects in interior 30 such as object 38. This allows a vehicle occupant such as occupant 44 to view interior objects such as object 38 even when it is dark outside of vehicle 10 and only small amounts of exterior light 50 from exterior light sources such as exterior light source 48 are entering interior 30.

In addition to interior lighting from light source 34, light may be emitted in interior 30 by components such as display 40 and image projector 54. Display 40 may be, for example, a backlit liquid crystal display that has an array of pixels that emit light 42 (e.g., to display images for a user of vehicle 10 such as occupant 44). Projector 54 may emit light 56 for displaying images on a projector screen in interior 30. Configurations in which projector 54 emits light 56 for displaying images on window 16 (e.g., by adjusting window 16 to be hazy and/or opaque at appropriate times) may also be used.

During the day, the ambient light levels outside of vehicle 10 in region 32 may be relatively large. This may lead to light reflections from the exterior of window 16 that help to obscure interior 30 from view by exterior observers such as observer 46. Privacy may be enhanced by providing window 16 with a fixed and/or adjustable reflectivity, by incorporating a fixed and/or adjustable light absorbing layer into window 16, and/or by incorporating a fixed and/or adjustable haze layer into window 16. To ensure that window 16 is as transparent as possible while privacy is preserved (e.g., to allow occupant 44 to observe external objects such as object 52 in exterior region 32 through window 16), it may be desirable to modulate the optical properties of window 16. For example, window 16 may be opaque whenever interior light from one or more interior light sources such as interior light 34, display 40, and/or projector 54 is present and may be transparent whenever interior light is at a low level or is completely absent.

With one suitable arrangement, window 16 is modulated with an alternating current modulation waveform and alternates between a first state in which window 16 has a first transmittance (e.g., a transmittance of 100%, a transmittance of more than 70%, a transmittance of 80-100%, etc.) and a second state in which window 16 has a second transmittance that is less than the first transmittance (e.g., a transmittance of 0-20%, a transmittance of less than 30%, etc. To prevent noticeable flickering in the appearance of window 16, the state of window 16 may be modulated at a rate that is greater than the human eye's ability to perceive varying light intensities (e.g., using an alternating current modulation waveform with a frequency of 60 Hz or more, 100 Hz or more, 200 Hz or more, etc.).

In dim lighting conditions, there is usually little risk that external observers such as external observer 46 will be able to view light from exterior region 32 that has penetrated window 16 to illuminate interior 30. There is, however, a significant risk that interior lighting (e.g., lighting from interior 30 such as interior light 36, display light 42, and projector light 56) may be visible to an external observer and may therefore compromise the privacy of occupant 44. To prevent light 36, light 42, and/or light 56 from exiting interior 30 for viewing by observer 46, light 36, 42, and/or 56 may be modulated in synchronization with the modulation of window 16 so that light 36, 42, and/or 56 is only present (or only has a high intensity) when window 16 is in a reduced transparency state such as the second state.

Privacy may therefore be enhanced by modulating light 36, 42, and/or 56 in synchronization with the alternating current modulation waveform used in controlling the transmittance of window 16, light 36, 42, and/or 56 may be turned off (and/or may have a minimized intensity value) when window 16 is in its first (higher transmittance) state and may be turned on (and/or may have a maximized intensity value) on when window 16 is in its second (lower transmittance) state. By turning light 36 off except when window 16 is in a low transmittance state, interior objects such as object 38 that are illuminated by light 36 will not be visible from exterior region 32. By turning off light 42 except when window 16 is in a low transmittance state, content on display 40 will be blocked from view by external observer 46. Turning off projector light 56 that is projected in interior 30 except when window 16 is in a low transmittance state may also prevent light 56 from being viewed by external observer 46. Light 36, light 42, and/or light 56 may be modulated in synchronization (so that two or more of these sources may be in synchronization with window 16) or only one of these light sources may be active and modulated in synchronization with window 16.

If desired, the light produced by components that are outside of vehicle 10 may also be modulated in synchronization with windows 16. For example, headlights, tail lights, and/or other exterior lights 26 on vehicle 10, exterior lighting associated with other vehicles, street lights, and/or other light produced by external light sources, may be modulated so that this light is only produced when windows 16 are in a low transmittance state. This may help reduce glare in interior 30.

To synchronize light producing components with windows 16, system 10 may actively monitor light sources for the presence of emitted light (e.g., using ambient light sensors). Light sensor information may then be used by control circuitry 24 in synchronizing windows 16 with the light producing components. If desired, wireless synchronization messages and/or other wirelessly transmitted synchronization information may be exchanged between vehicle 10 and other light producing devices to help synchronize light producing devices with windows 16. In arrangements in which control circuitry 24 can communicate with light producing components using hardwired paths, control circuitry 24 can synchronize the light producing components with windows 16 by supplying both the producing components and windows 16 with respective synchronized control signals over the hardwired paths.

Figure 3:
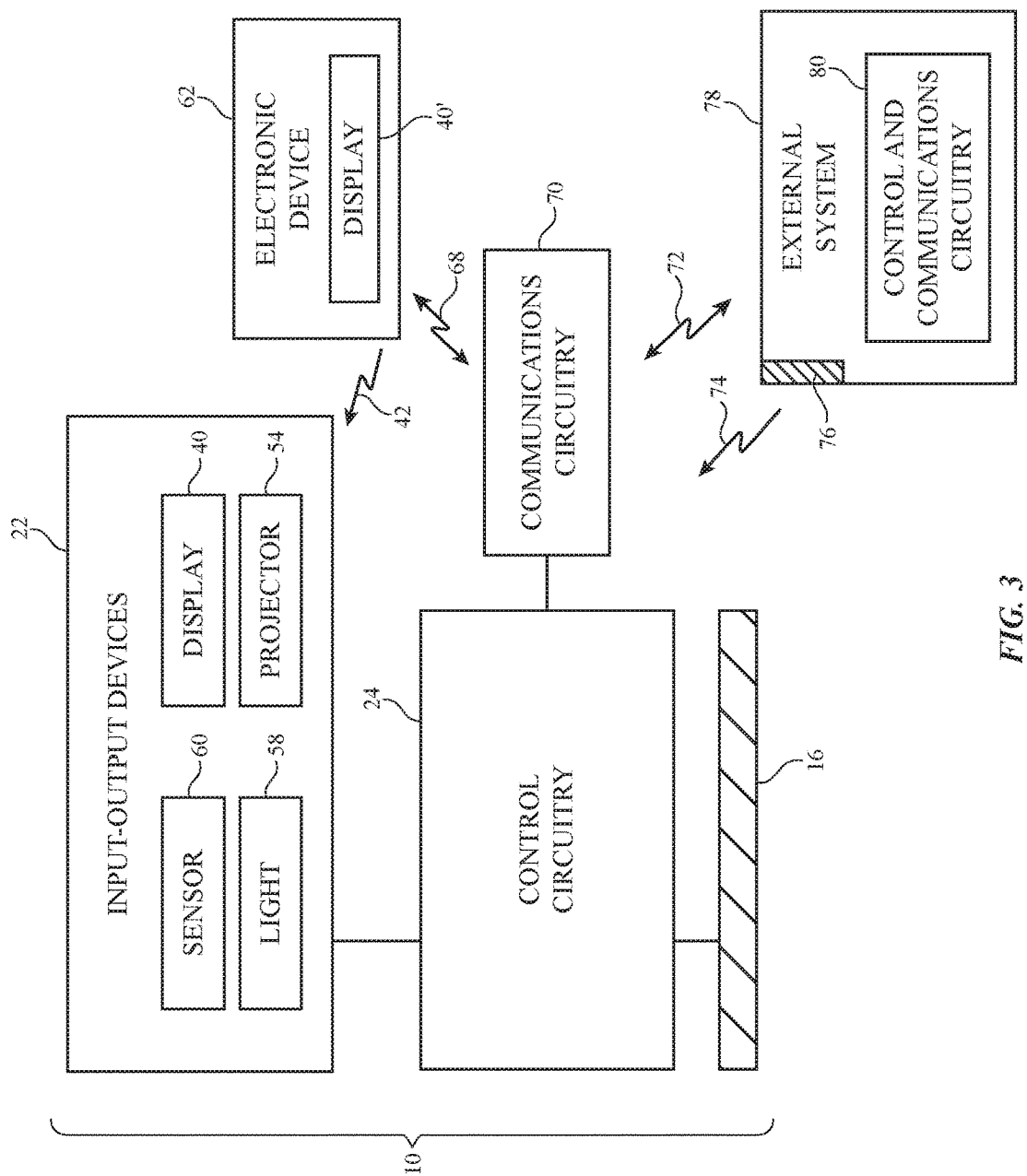
FIG. 3 is a diagram of illustrative components in a system with a window in accordance with an embodiment.

FIG. 3 is a system diagram showing components and communications paths that may be used in ensuring synchronization between light producing components and windows 16. As shown in FIG. 3, input-output components 22 may include light-emitting components such as light 58 (e.g., interior light 34 or exterior light 26) and projector 54.

Display 40 in interior 30 may be a display this is mounted into a headrest, dashboard, door panel, seat, headliner, and/or other portion of vehicle 10. In some situations, the display in interior 30 (display 40) may be a display associated with a portable electronic device that has been placed in interior (see, e.g., display 40' of portable electronic device 62). Device 62 may be, for example, a cellular telephone, laptop computer, tablet computer, watch, or other portable electronic device belonging to occupant 44 of vehicle 10. Device 62 may have a display (display 40') that emits light 42.

Another source of light involves external electronic equipment such as external system 78. Systems such as system 78 are located in exterior region 32 and may include vehicles, buildings, roadside signs, and/or other external equipment. Equipment 78 may include a light-emitting component such as light 76 (e.g., a vehicle headlight or tail light or other exterior light, a street lamp, building lighting, lighting on a sign, etc.).

Light sources such as display 40 in a dashboard or other built-in display in vehicle 10, projector 54, and interior light 58 may be hardwired to control circuitry 24 and may therefore be modulated by control circuitry 24 in synchronization with the modulation of windows 16 that is controlled by control circuitry 24 (e.g., over a hardwired path). Other equipment such as electronic device 62 and external system 78 may produce light without direct hardwired control from control circuitry 24.

One way of ensuring that the light produced by display 40' and by light 76 is synchronized with window 16 is for control circuitry 24 to use light sensor 60 to capture information on emitted light 42 from display 40' and emitted light 74 from light 76. Display 40' and system 78 may emit light that is modulated at a predetermined known frequency (e.g., 200 Hz). Based on light measurements from sensor 60, control circuitry 24 can make phase and/or frequency adjustments to the modulation of window 16 to ensure that the modulation of window 16 is synchronous with the modulation of light 40' and 76. Schemes in which device 62 and/or system 78 use light sensors to synchronize to window 16 may also be used.

Another way of ensuring that the modulation of window 16 is synchronized with the modulation of light 42 and light 74 is to rely on wireless communications between vehicle 10 and device 62 and system 78. Vehicle 10 may, for example, include wireless communications circuitry 70. Wireless communications circuitry 70 may include an antenna and wireless transceiver circuitry configured to communicate wirelessly with corresponding antennas and wireless transceiver circuits in device 62 and system 78 over respective wireless links 68 and 72. By exchanging wireless synchronization messages or other information, vehicle 10 and other equipment such as device 62 and system 78 can agree to modulate windows 16 and light producing components such as display 40' and light 76 in synchronization with each other.

Figure 4:
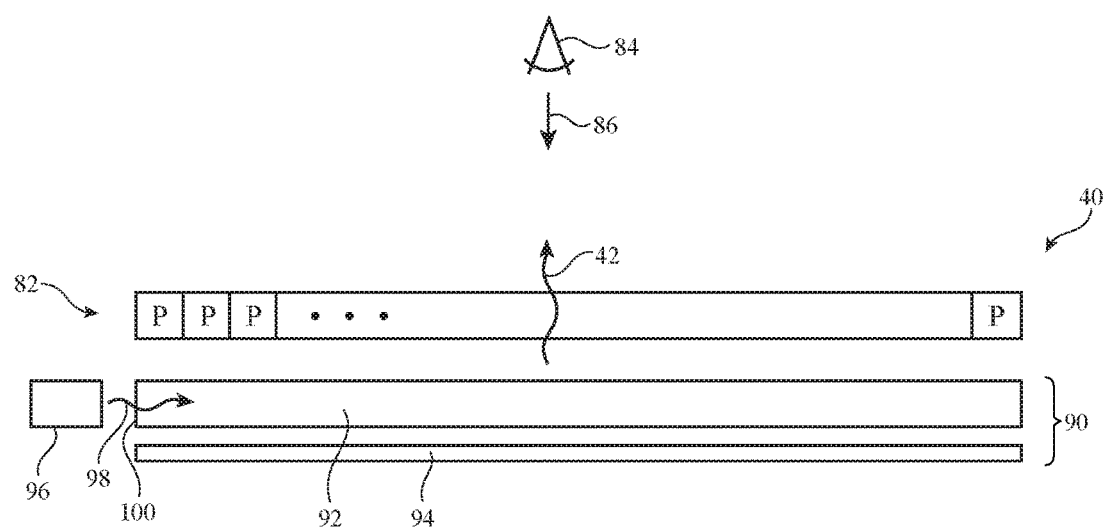
FIG. 4 is a cross-sectional side view of an illustrative display having a backlight with a light source that may be modulated in accordance with an embodiment.

To modulate light 42 from display 40 (and display 40'), it may be desirable to provide display 40 (and 40') with a configuration of the type shown in FIG. 4. In the example of FIG. 4, display 40 has an array of pixels P such as pixel array 82. Pixel array 82 may be, for example, a liquid crystal display. Backlight unit 90 may produce backlight illumination (e.g., emitted light 42) that passes through pixel array 82 to present images to a viewer such as viewer 84 who is viewing display 40 in direction 86. Backlight unit (backlight) 90 may have a light source such as light source 96. Light source 96 may include an array of light-emitting diodes that emit light 98 into edge 100 of light guide layer 92. Light 98 may propagate laterally in light guide layer 92 due to the principal of total internal reflection. Light extraction features on layer 92 may help direct some of light 98 out of layer 92 and upwards through pixel array 82 as light 42. Reflector 94 may help reflect light that has been extracted downwardly back in the upwards direction through pixel array 82. The overall intensity of light 42 may be modulated at 200 Hz or using an alternating current modulation waveform with another suitable alternating current frequency. For example, control circuitry 24 may supply a 200 Hz square wave drive current to light source 96 (as an example).

Figure 5:
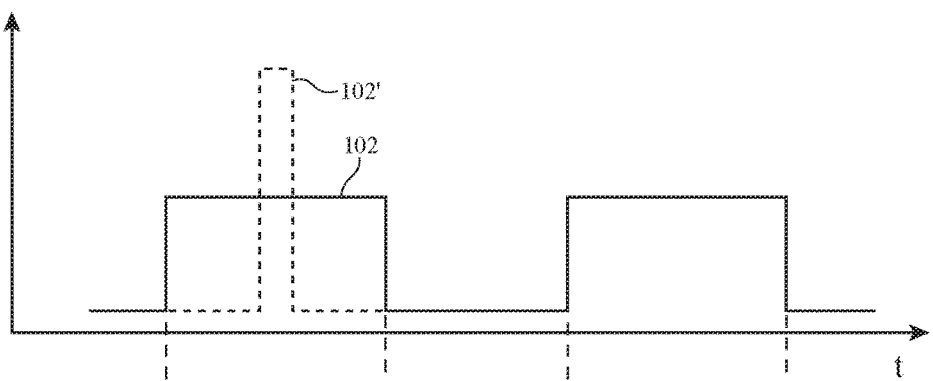
FIG. 5 is a graph showing how modulated light output from an interior light or interior display may be synchronized with a modulated window transparency in accordance with an embodiment.
Figure 5:
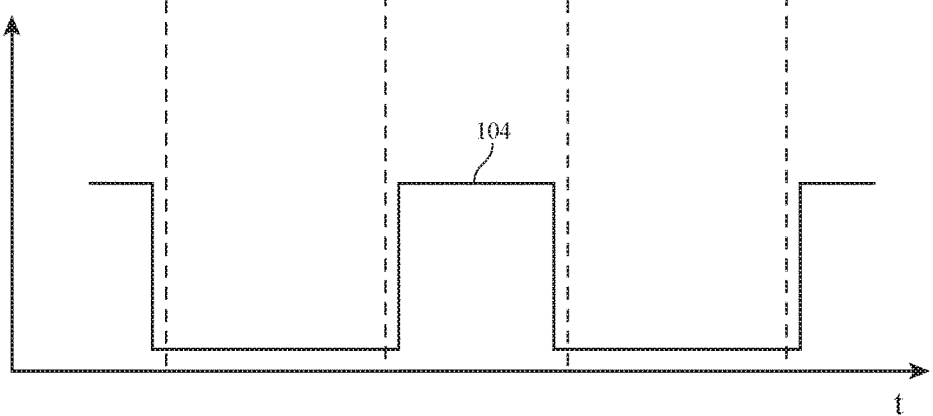

The graph of FIG. 5 illustrates how the intensity of interior light 36, light 42, and/or light 56 may be modulated as a function of time. Curve 102 of FIG. 5 represents an illustrative alternating current light output modulation waveform that may be used in modulating output light intensity. The graph of FIG. 5 also shows how the optical properties of window 16 may be modulated as a function of time using the illustrative alternating current modulation waveform of curve 104. The modulation waveforms represented by curves 102 and 104 are synchronized. During time periods when curve 102 is high, the intensity of light 36, light 42, and/or light 56 is high (maximized). During time periods when curve 102 is low, the intensity of light 36, light 42, and/or light 56 is correspondingly low (e.g., light intensity is minimized by turning the emitted light off or by at least reducing emitted light intensity during these low periods). Curve 104 may be complementary to curve 102 or may otherwise be synchronized with curve 102 to ensure that window transparency is reduced (i.e., light transmittance is reduced and/or haze is increased) whenever the emitted light of curve 102 is high and to ensure that window transparency is enhanced (i.e., light transmittance is increased and/or haze is reduced) whenever light intensity 102 is at its lower level. If desired, the pulses of emitted light from the modulated light source(s) may be shorter than the pulses of window modulation curve 104 (see, e.g., pulse 102'). It is also possible to somewhat misalign the modulation waveforms of curves 102 and 104 (e.g., so that the pulses in these signals are not perfectly complementary, but rather are shifted slightly with respect to each other), although doing so will reduce the light blocking ability of windows 16. Light intensity and window transparency are modulated using square wave modulation waveforms in the example of FIG. 5, but can be modulated using other suitable alternating-current waveforms (e.g., sinusoidal, triangular, etc.) if desired.

Figure 6:
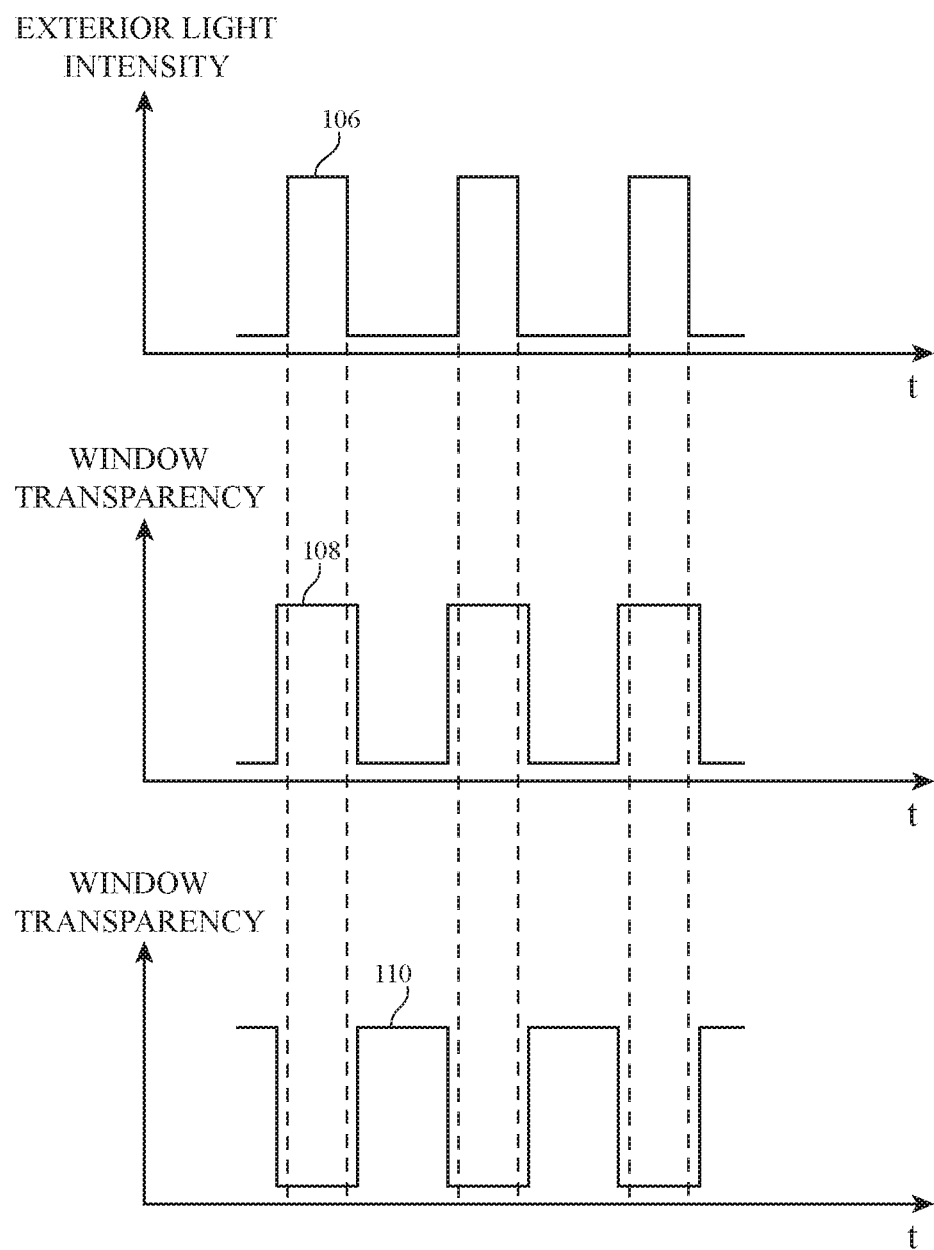
FIG. 6 is a graph showing how modulated exterior light from an exterior lighting source may be synchronized with window transparency modulation in accordance with an embodiment.

FIG. 6 is a graph showing how exterior light intensity (curve 106) can be synchronized with windows 16. Light intensity curve 106 represents the light intensity of light emitted from an external device such as light 74 from light 76 of FIG. 3. Light 74 is emitted from a location outside of interior 30 and may therefore represent an undesired source of glare for occupant 44. To reduce the transmission of undesired exterior lighting into interior 30 and thereby reduce glare, window transparency may be decreased (e.g., by decreasing light transmittance and/or increasing haze for window 16) whenever light intensity 106 is high, as illustrated by illustrative window transparency modulation waveform (e.g., window light transmittance modulation waveform) 110. This modulation scheme may also enhance privacy when exterior light 74 is a significant lighting source for illuminating interior 30. Glare reducing light modulation (curve 110) may be used, for example, for side windows 16. A driver of vehicle 10 may be viewing the exterior of vehicle 10 through a front window. To ensure that the driver can view external objects satisfactorily (e.g., when light 74 is associated with a headlight on vehicle 10 and/or nearby vehicles or is associated with a street light), window transparency may be increased (e.g., by increasing light transmittance and/or reducing haze) whenever light intensity 106 is high, as illustrated by illustrative window transparency modulation curve 108.

Figure 7:
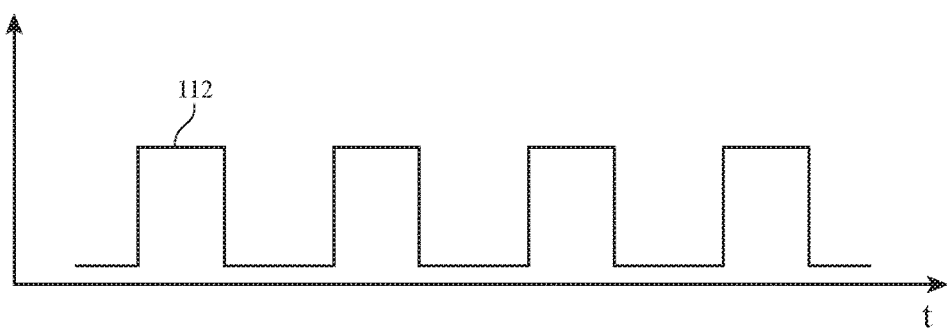
FIG. 7 is a graph showing how the modulated output of a projector in a vehicle interior may be synchronized with window transparency modulation in accordance with an embodiment.
Figure 7:
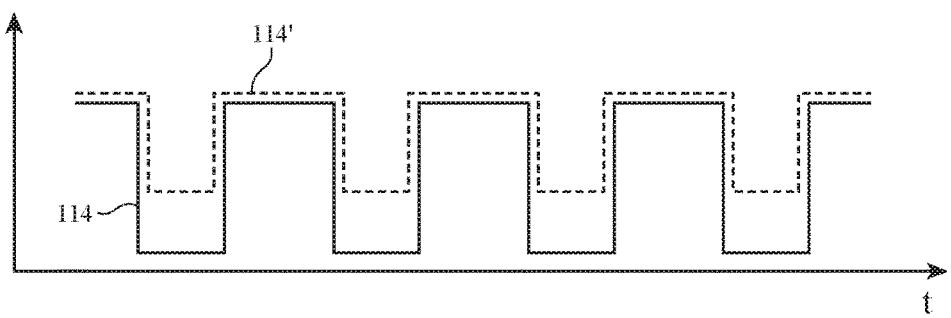

The output of projector 54 may, if desired, be directed towards windows 16. Windows 16 may include an adjustable haze layer and/or an adjustable light transmission layer. Light 56 from projector 54 may be modulated with an alternating-current modulation waveform (e.g., at 200 Hz), such as illustrative modulation curve 112 of FIG. 7. In synchronization, windows 16 may be modulated to exhibit reduced transparency (reduced light transmittance and/or increased haze) whenever a pulse of emitted light 56 is present (see, e.g., curve 114). In this way, an occupant of vehicle 10 can view images on windows 16 that have been projected by projector 54.

If the exterior of vehicle 10 is dark, curve 114 may be used to modulate windows 16 to maximize the reflection of light 56 back towards occupant 44 so that occupant 44 can view images projected onto window 56 by projector 54. If the exterior of vehicle 10 is brighter, it may be desirable to use projector 54 and window 16 to form a heads up display. In this scenario, the transparency of windows 16 may be modulated in accordance with curve 114 or curve 114'. With curve 114', the transparency of windows 16 is reduced less than with curve 114, which enhances the overall transparency of window 16 and enhances the ability of occupant 44 to view external objects such as object 52 outside of vehicle 10 through window 16. If the external scene viewed through window 16 is sufficiently bright and/or if the image projected by projector 54 is dim, window 16 may be modulated in accordance with cure 114, which provides less overall transparency than curve 114' but which maximizes reflected light by ensuring that window transparency is minimized when the light output of curve 112 is maximized.

The foregoing is merely illustrative and various modifications can be made to the described embodiments. The foregoing embodiments may be implemented individually or in any combination.

What is claimed is:

1. A vehicle, comprising:
a body having an interior;
control circuitry;
an adjustable window in the body that is between the interior and an exterior region surrounding the body, wherein the adjustable window has an optical property that is modulated by the control circuitry; and
a light source that produces output light that is modulated by the control circuitry in synchronization with the modulation of the optical property of the adjustable window, wherein the light source comprises an internal light that emits the output light and wherein the output light at least partially illuminates the interior.

2. The vehicle defined in claim 1 wherein the adjustable window comprises a light modulator layer and wherein the optical property comprises a light transmittance of the adjustable window that the control circuitry modulates using the light modulator layer.

3. The vehicle defined in claim 2 wherein the control circuitry is configured to modulate the light transmittance of the light modulator layer in accordance with an alternating-current light transmittance modulation waveform and is configured to modulate the output light with a synchronized alternating-current light output modulation waveform.

4. The vehicle defined in claim 3 wherein the light modulator layer comprises a light modulator layer selected from the group consisting of: a liquid crystal light modulator with polarizers, a guest-host liquid crystal light modulator layer, and a cholesteric liquid crystal light modulator layer.

5. The vehicle defined in claim 3 wherein the alternating-current light transmittance modulation waveform has a frequency of at least 60 Hz.

6. The vehicle defined in claim 1 wherein the internal light includes at least one light-emitting diode that emits the output light.

7. The vehicle defined in claim 1 wherein the internal light forms part of a display having a pixel array that displays images.

8. The vehicle defined in claim 7 wherein the display has a backlight unit with at least one light-emitting diode that produces the output light.

9. The vehicle defined in claim 3 wherein the light source comprises an image projector.

10. The vehicle defined in claim 1 wherein the adjustable window comprises an adjustable reflectivity layer, wherein the optical property is a reflectivity of the adjustable window that is modulated by the control circuitry, and wherein the adjustable reflectivity layer comprises a cholesteric liquid crystal layer.

11. The vehicle defined in claim 1 wherein the adjustable window comprises an adjustable haze layer and wherein the optical property is a haze of the adjustable window that is modulated by the control circuitry.

12. The vehicle defined in claim 11 wherein the adjustable haze layer comprises a polymer dispersed liquid crystal layer.

13. A vehicle, comprising:
a body having an interior;
control circuitry;
an adjustable window in the body that is between the interior and an exterior region surrounding the body, wherein the adjustable window has an optical property that is modulated by the control circuitry; and
a light source that produces output light that is modulated by the control circuitry in synchronization with the modulation of the optical property of the adjustable window, wherein the optical property that is modulated comprises a window transparency for the adjustable window, wherein the window transparency is reduced when the output light is increased, and wherein the window transparency is increased when the output light is decreased.

14. A vehicle, comprising:
a body having an interior;
control circuitry;
an adjustable window in the body that is between the interior and an exterior region surrounding the body, wherein the adjustable window has an optical property that is modulated by the control circuitry; and
a light source that produces output light that is modulated by the control circuitry in synchronization with the modulation of the optical property of the adjustable window, wherein the light source comprises an exterior light source and the output light comprises external light supplied by the exterior light source.

15. The vehicle defined in claim 14, wherein the optical property that is modulated comprises a window transparency for the adjustable window, and wherein the window transparency is modulated by a first alternating current modulation waveform and alternates between a first transparency and a second transparency that is greater than the first transparency.

16. The vehicle defined in claim 15, wherein the external light is modulated by a second alternating current modulation waveform that is synchronized with the first alternating current modulation waveform, wherein the external light alternates between a first intensity when the adjustable window has the first transparency and a second intensity that is less than the first intensity when the adjustable window has the second transparency, further comprising a light sensor, wherein the control circuitry synchronizes the first alternating current modulation waveform and the second alternating current modulation waveform using information on the external light measured with the light sensor.

17. A vehicle, comprising:
a body having an interior;
control circuitry;
an adjustable window in the body that is between the interior and an exterior region surrounding the body, wherein the adjustable window has an optical property that is modulated by the control circuitry; and
a light source that produces output light that is modulated by the control circuitry in synchronization with the modulation of the optical property of the adjustable window, wherein the optical property that is modulated comprises a window transparency for the adjustable window, wherein the window transparency is modulated by an alternating current modulation waveform and alternates between a first transparency and a second transparency that is greater than the first transparency.

18. The vehicle defined in claim 17 wherein the adjustable window comprises an adjustable reflectivity layer, wherein the optical property is a reflectivity of the adjustable window that is modulated by the control circuitry, and wherein the adjustable reflectivity layer comprises a cholesteric liquid crystal layer.

19. The vehicle defined in claim 17 wherein the adjustable window comprises an adjustable haze layer and wherein the optical property is a haze of the adjustable window that is modulated by the control circuitry.

20. The vehicle defined in claim 13 wherein the adjustable window comprises an adjustable reflectivity layer, wherein the optical property is a reflectivity of the adjustable window that is modulated by the control circuitry, and wherein the adjustable reflectivity layer comprises a cholesteric liquid crystal layer.

* * * * *